United States Patent
Park

(10) Patent No.: US 11,498,430 B2
(45) Date of Patent: Nov. 15, 2022

(54) ECO-FRIENDLY VEHICLE AND METHOD OF CONTROLLING COASTING FOR THE SAME

(71) Applicants: HYUNDAI MOTOR COMPANY, Seoul (KR); KIA MOTORS CORPORATION, Seoul (KR)

(72) Inventor: Joon Young Park, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 156 days.

(21) Appl. No.: 17/027,020

(22) Filed: Sep. 21, 2020

(65) Prior Publication Data

US 2021/0146787 A1 May 20, 2021

(30) Foreign Application Priority Data

Nov. 18, 2019 (KR) .................. 10-2019-0147395

(51) Int. Cl.
| | |
|---|---|
| B60L 15/20 | (2006.01) |
| B60W 20/12 | (2016.01) |
| B60W 20/14 | (2016.01) |
| B60W 30/18 | (2012.01) |
| B60W 50/14 | (2020.01) |
| B60W 50/00 | (2006.01) |

(52) U.S. Cl.
CPC ......... *B60L 15/2045* (2013.01); *B60W 20/12* (2016.01); *B60W 20/14* (2016.01); *B60W 30/18072* (2013.01); *B60W 30/18127* (2013.01); *B60W 50/0097* (2013.01); *B60W 50/14* (2013.01); *B60L 2240/423* (2013.01); *B60L 2240/60* (2013.01); *B60L 2250/26* (2013.01)

(58) Field of Classification Search
None
See application file for complete search history.

(56) References Cited

U.S. PATENT DOCUMENTS 9,783,200 B2 * 10/2017 Park ................ B60W 30/18072
10,018,234 B2 * 7/2018 Huh ...................... B60W 10/02
(Continued)

FOREIGN PATENT DOCUMENTS

DE 102013211340 A1 12/2014

OTHER PUBLICATIONS

European Search Report cited in European app No. 20196441.8; dated Mar. 17, 2021; 10 pp.

*Primary Examiner* — Todd Melton
(74) *Attorney, Agent, or Firm* — Lempia Summerfield Katz LLC

(57) ABSTRACT

A method of controlling coasting of an eco-friendly vehicle includes: determining at least one effective event among deceleration events configured with a target speed in a forward driving path; setting a closest effective event based on a current position among the at least one effective event as a first candidate event; determining whether at least one second candidate event corresponding to an event needed to be followed is present among remaining effective events except for the first candidate event of the at least one effective event; and, when the at least one second candidate event is present, determining a target event among the first candidate event and the second candidate event in consideration of a control start point.

19 Claims, 10 Drawing Sheets

(56) References Cited

U.S. PATENT DOCUMENTS

2016/0121898 A1* 5/2016 Jo .................. B60W 30/18072
                                                              180/65.21
2019/0001984 A1   1/2019 Huh et al.
2019/0100204 A1*  4/2019 Plianos ........... B60W 30/18127
2019/0322280 A1  10/2019 Huh et al.

* cited by examiner

ECO-FRIENDLY VEHICLE AND METHOD OF CONTROLLING COASTING FOR THE SAME

This application claims the benefit of priority to Korean Patent Application 10-2019-0147395, filed on Nov. 18, 2019, which is hereby incorporated by reference as if fully set forth herein.

BACKGROUND

Field of the Disclosure

The present disclosure relates to an eco-friendly vehicle and a method of controlling coasting for the same for conveniently and effectively guiding coasting.

Discussion of the Related Art

An internal combustion engine vehicle using fossil fuel such as gasoline or diesel inevitably discharges exhaust gas. Such exhaust gas includes carbon dioxide called a main cause of global warming, fine dust, and other materials that are harmful to a human body. To reduce such exhaust gas, vehicle manufacturers have developed various types of vehicles. A representative example of an eco-friendly vehicle includes an electric vehicle (EV) using only a battery and a motor, a hybrid electric vehicle/plug-in hybrid electric vehicle (HEV/PHEV) that travels using an engine and a motor, or a fuel cell electric vehicle (FCEV) driven by operating a motor using power generated from a hydrogen fuel cell.

Differently from a conventional vehicle including only an internal combustion engine, the eco-friendly vehicle may generate energy required for driving through a motor and may also recover kinetic energy through the motor. Energy is recovered through the motor by outputting decelerating force, required for braking according to brake pedal manipulation of a driver or coasting based on vehicle inertia, by the motor.

An energy recovery method through a motor may be referred to as regenerative braking. Energy acquired through the regenerative braking is stored in a battery and is later used for acceleration through the motor to save fuel required to drive an engine.

Energy is considerably frequently recovered through regenerative braking while an eco-friendly vehicle travels. When a deceleration event such as an intersection, a traffic light, a vehicle slip road, or a vehicle recommended speed hazard guide section is present forward and a vehicle needs to be decelerated. A driver may recognize the deceleration event with the naked eye and may take his or her foot off an accelerator pedal or may depress on a brake pedal to decelerate the vehicle to a target speed. During this procedure, the eco-friendly vehicle may also recover energy through a motor. However, most drivers may slowly take his or her foot off an accelerator pedal compared with an appropriate time point of releasing the accelerator pedal. Most drivers may then manipulate a brake pedal to decelerate the vehicle, and thus, a significant amount of energy may be exhausted due to friction brake through a hydraulic brake system, which is described with reference to FIG. 1.

FIG. 1 is a diagram showing a deceleration form of a general deceleration event.

Referring to FIG. 1, when a vehicle travels with a higher current vehicle speed than a target vehicle speed on a path in which a deceleration event configured with a target vehicle speed is present forward, a general eco-friendly vehicle may perform regenerative braking with coasting torque of a preset profile depending on a vehicle speed when manipulation of an accelerator pedal is released. Thus, an accelerator pedal needs to be released at a point (i.e., an APS OFF point for coasting) at which the driver is not capable of recognizing an event target point with the naked eye depending on a difference between the current speed and the target vehicle speed in order to satisfy the target vehicle speed at the event target point. In this case, when the driver actually recognizes an event target point with the naked eye to be positioned past an APS OFF point for coasting, the driver tends to release an accelerator pedal, and thus, there is a problem in that energy is not absorbed using only coasting torque and friction brake intervene so as to degrade efficiency. In other words, when motor torque is controlled to be minus and the vehicle relies on passive coasting control for realizing decelerating force similarly to a general internal combustion engine vehicle, it may be disadvantageous in terms of fuel efficiency.

In addition, when motor torque control for copying decelerating force during coasting of an internal combustion engine vehicle is applied, if a target vehicle speed corresponds to a relatively low vehicle speed in a situation in which a speed limit and an average vehicle speed of a current road are relatively high, a long control distance is needed to correspond to the target vehicle speed. Thus, the vehicle is decelerated for a predetermined distance at a lower vehicle speed than the average vehicle speed of the current road, and thus, may also impede traffic flow of surrounding vehicles.

Needless to say, disclosed is technology of pre-detecting a forward deceleration event and reporting a time point of releasing an accelerator pedal in consideration of a target speed and current speed of the event. Thus, coasting may begin even at a distance at which an event target point is not capable of being recognized with the naked eye, which is described with reference to FIGS. 2A and 2B.

FIG. 2A illustrates an example of a forward road situation and FIG. 2B illustrates an example of the form of guiding a general coasting time point in the situation of FIG. 2A.

Referring to FIG. 2A, in order to guide a time point of releasing an accelerator pedal, a vehicle checks whether a deceleration event is present forward on a driving path. In general, the vehicle determines whether a deceleration event positioned within a preset distance, i.e., an effective distance for acquiring forward data is present. In FIG. 2A, two events Event 1 and Event 2 are present in the effective distance for acquiring forward data.

In this case, the vehicle may calculate a point for entry into control in consideration of a remaining distance to each event target point from a current position of the vehicle, a current speed, and a target vehicle speed corresponding to each event. In this case, with respect to Event 1, the vehicle already passes by a point for entry into control, and thus is not capable of responding, and thus, the vehicle may guide release of an accelerator pedal at a point for entry into control with respect to Event 2.

When the aforementioned method is applied, it may also be possible to appropriately guide an invisible event target point. However, the method is not likely to correspond to flow of surrounding vehicles.

In addition, technology is known for considering a remaining distance to a separate deceleration event, a target vehicle speed, and a current speed when a plurality of deceleration events is present forward of a vehicle. However, in this method, an event by which an accelerator pedal needs to be released, first of all irrespective of a remaining distance from an actual event target point, may be set to a target event and guidance may be performed. In this case, there is a problem in that the flow of surrounding vehicles or the closest event target point is disregarded and a driver senses incompatibility and anxiety. In addition, a type of a deceleration event may not be considered. Thus, when a deceleration event by which a control entry point is primarily reached is set to a target event, the vehicle is not capable of responding to deceleration events that are positioned before and after the corresponding deceleration event and have different target speeds.

SUMMARY

Accordingly, the present disclosure is directed to an eco-friendly vehicle and a method of controlling coasting for the same for providing guidance to effectively respond to a forward deceleration event, i.e., a deceleration event ahead of the vehicle.

The technical problems solved by the embodiments are not limited to the above technical problems. Other technical problems, which are not described herein, should become apparent to those having ordinary skill in the art from the following description.

To achieve these objects and other advantages and in accordance with the purpose of the present disclosure, as embodied and broadly described herein, a method is disclosed of controlling coasting of an eco-friendly vehicle. The method includes determining at least one effective event among deceleration events configured with a target speed in a forward driving path. The method further includes setting a closest effective event based on a current position among the at least one effective event as a first candidate event. The method further includes setting at least one second candidate event corresponding to an event needed to be followed among remaining effective events except for the first candidate event of the at least one effective event as the second candidate event. The method further includes determining whether the second candidate event is present. The method further includes determining a target event among the first candidate event and the second candidate event in consideration of a control start point. At the control start point, it is possible to satisfy a corresponding target speed through coasting torque control of an electric motor when an accelerator pedal is released with respect to each of the first candidate event and the second candidate event.

In another aspect of the present disclosure, an eco-friendly vehicle includes a controller including a deceleration event determiner configured to determine at least one effective event among deceleration events configured with a target speed in a forward driving path. The controller further includes a candidate event setting unit configured to set a closest effective event based on a current position among the at least one effective event as a first candidate event, and to set at least one second candidate event corresponding to an event needed to be followed among remaining effective events except for the first candidate event of the at least one effective event as the second candidate event. The candidate event setting unit further determines whether the second candidate event is present. The controller further includes a target event determiner configured to determine a target event among the first candidate event and the second candidate event in consideration of a control start point. At the control start point, it is possible to satisfy a corresponding target speed through coasting torque control of an electric motor when an accelerator pedal is released with respect to each of the first candidate event and the second candidate event.

In another aspect of the present disclosure, a method of controlling coasting of an eco-friendly vehicle includes determining at least one effective event among deceleration events configured with a target speed in a forward driving path. The method also includes setting a closest effective event based on a current position among the at least one effective event as a first candidate event. The method also includes determining whether at least one second candidate event corresponding to an event needed to be followed is present among remaining effective events except for the first candidate event of the at least one effective event. The method further includes, when the at least one second candidate event is present, determining a target event among the first candidate event and the second candidate event in consideration of a control start point at which it is possible to satisfy a corresponding target speed through coasting torque control of an electric motor when an accelerator pedal is released with respect to each of the first candidate event and the second candidate event.

In another aspect of the present disclosure, an eco-friendly vehicle includes a controller including a deceleration event determiner configured to determine at least one effective event among deceleration events configured with a target speed in a forward driving path. The eco-friendly vehicle also includes a candidate event setting unit configured to set a closest effective event based on a current position among the at least one effective event as a first candidate event. The candidate event setting unit also determines whether at least one second candidate event corresponding to an event needed to be followed is present among remaining effective events except for the first candidate event of the at least one effective event. The eco-friendly vehicle also includes a target event determiner configured to, when the at least one second candidate event is present, determine a target event among the first candidate event and the second candidate event in consideration of a control start point at which it is possible to satisfy a corresponding target speed through coasting torque control of an electric motor when an accelerator pedal is released with respect to each of the first candidate event and the second candidate event.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the present disclosure. In the drawings.

DETAILED DESCRIPTION OF THE INVENTION

Figure 1:
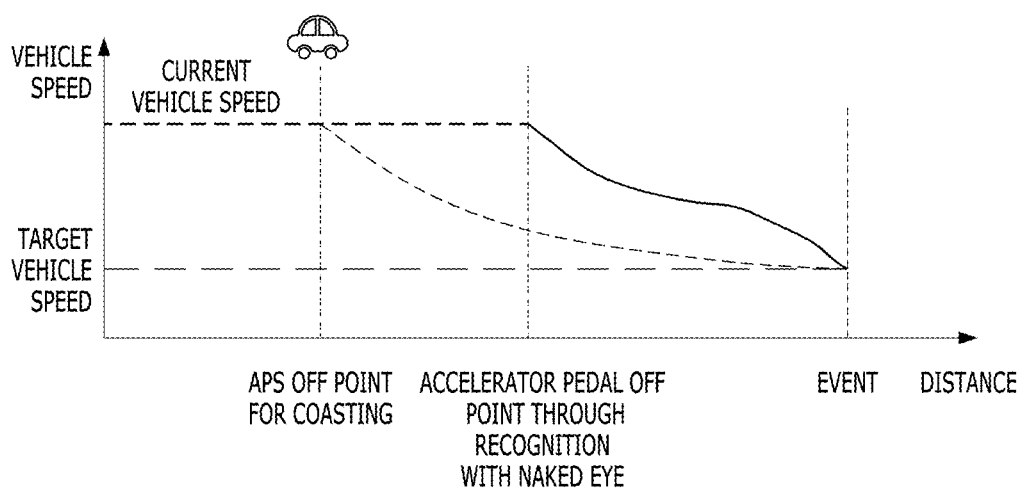
FIG. 1 is a diagram showing a deceleration form of a general deceleration event.
Figure 2A:
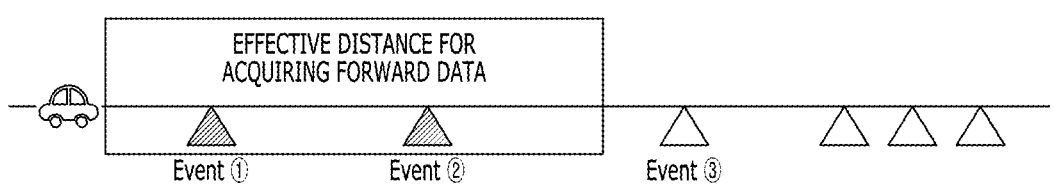
FIG. 2A illustrates an example of a forward road situation and FIG. 2B illustrates an example of the form of guiding a general coasting time point in the situation of FIG. 2A.
Figure 2B:
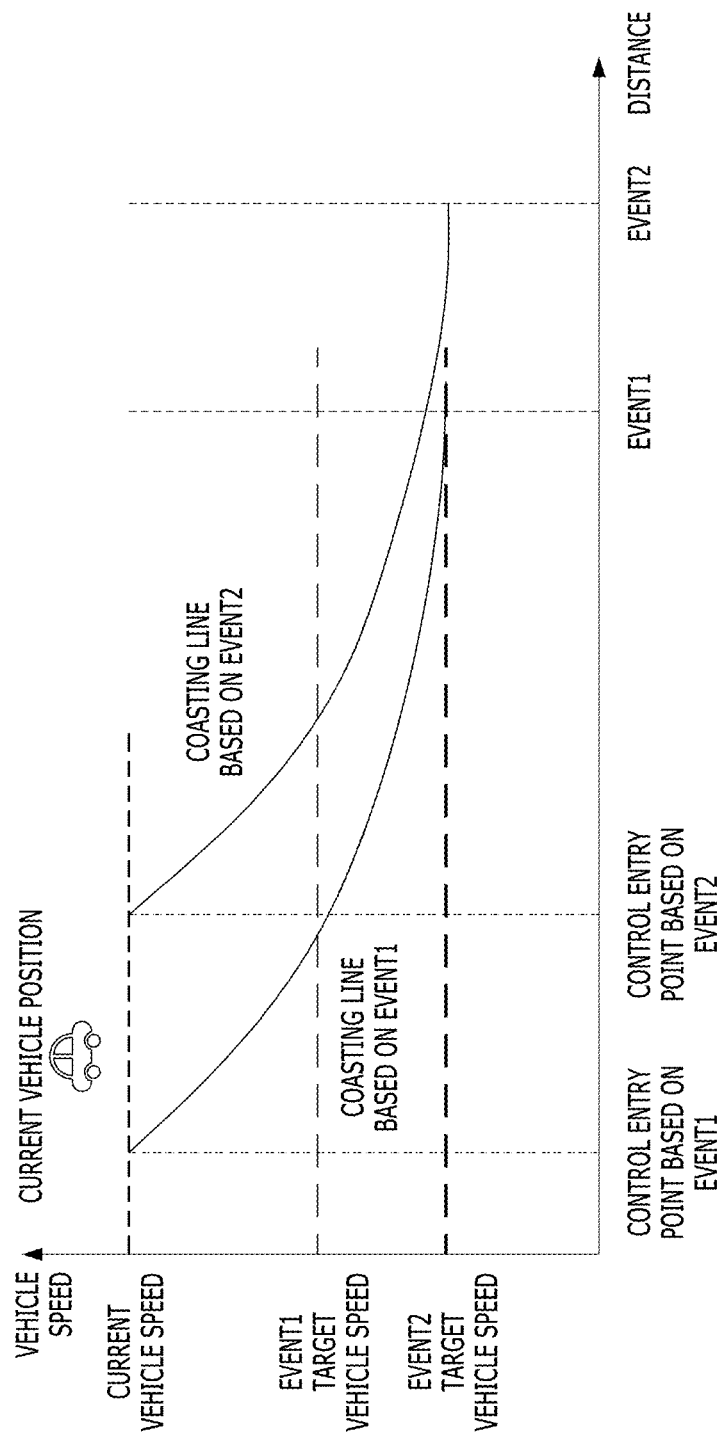

Specific embodiments of the present disclosure are described in detail, so as for those having ordinary skill in the art to easily implement, with reference to the accompanying drawings. However, the present disclosure may be implemented in various different forms and is not limited to these embodiments. To clearly describe the present disclosure, any part that does not concern the description has been omitted in the drawings.

In addition, when a certain part "includes" a certain component, this indicates that the part may further include another component instead of excluding another component, unless specifically set forth in the disclosure. The same reference numbers are used throughout the drawings and the specification to refer to the same or equivalent parts. When a component, device, element, or the like of the present disclosure is described as having a purpose or performing an operation, function, or the like, the component, device, or element should be considered herein as being "configured to" meet that purpose or to perform that operation or function. Further, the controllers and other such units and determiners described herein may include a processor programmed to perform the noted operation, function, operation, or the like.

According to a proposal of an embodiment of the present disclosure, an eco-friendly vehicle: may determine a controllable effective event by which it is possible to provide a start time point for coasting among forward deceleration events; may classify a type of the controllable effective event; may set at least one control target candidate event; may guide a time point of releasing an accelerator pedal (i.e., start time point for coasting); and may perform coasting torque control.

First, a structure of an eco-friendly vehicle according to an embodiment is described with reference to FIG. 3.

Figure 3:
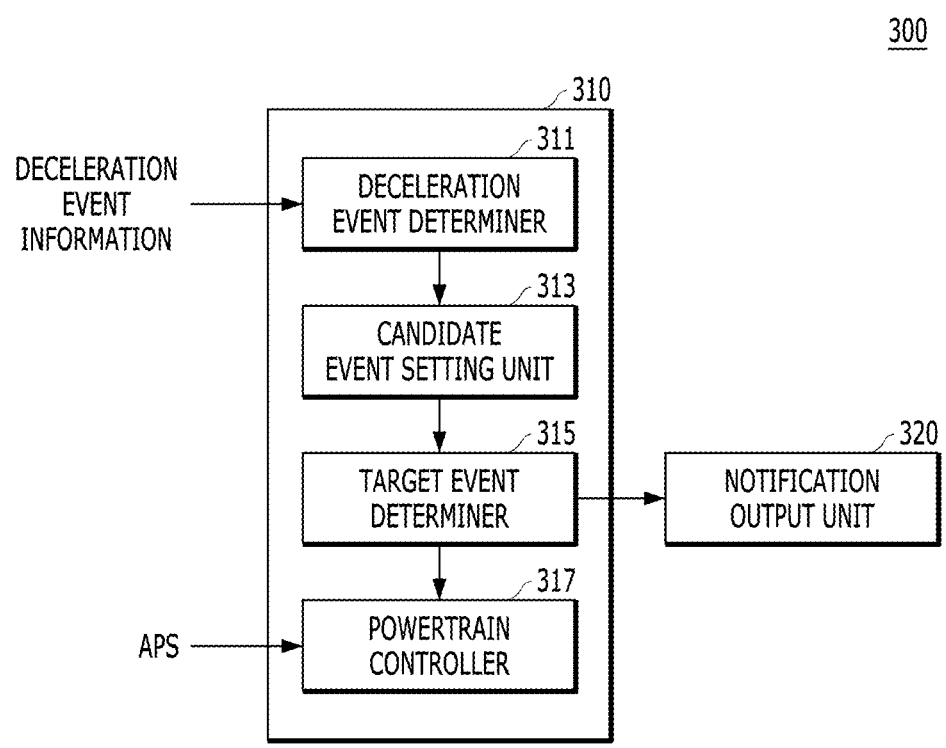
FIG. 3 is a diagram showing an example of a structure of a vehicle for performing coasting control according to an embodiment of the present disclosure.

FIG. 3 is a diagram showing an example of a structure of a vehicle for performing coasting control according to an embodiment of the present disclosure.

Referring to FIG. 3, an eco-friendly vehicle 300 according to an embodiment may include a coasting controller 310. The eco-friendly vehicle may also include a notification output unit 320 for outputting a notification indicating a time point of releasing an accelerator pedal corresponding to a target event determined by the coasting controller 310.

The coasting controller 310 may have deceleration event information and a value of an accelerator pedal sensor (APS) as input information and may have information on a time point of releasing the accelerator pedal as an output value.

The notification output unit 320 may output information on the time point of releasing the accelerator pedal in a predetermined form recognizable by the driver. To this end, the notification output unit 320 may include a display or indicator for visually outputting the time point of releasing the accelerator pedal. For example, the notification output unit 320 may include a head up display (HUD), a cluster, a display of a head unit, or the like, but the present disclosure is not limited thereto. The notification output unit 320 may also include a speaker for audibly outputting notification indicating the time point of releasing the accelerator pedal.

The coasting controller 310 may include a deceleration event determiner 311, a candidate event setting unit 313, a target event determiner 315, and a powertrain controller 317. Hereinafter, functions of respective components included in the coasting controller 310 are described.

First, the deceleration event determiner 311 may determine whether a deceleration event is present within an effective distance for acquiring forward data based on information on a deceleration event. When recognizing at least one deceleration event, the deceleration event determiner 311 may determine whether the vehicle is capable of responding to each deceleration event.

For example, the deceleration event information may be acquired through a navigation system, a telematics system, or the like. Further, the deceleration event information may include a type and position of a deceleration event, a road type, the number of lanes, a gradient to the corresponding position, real-time traffic information, and the like based on position information of GPS and information on a high-precision map of a navigation system. However, the present disclosure is not limited thereto.

The deceleration event may include any type of event by which a target speed is set, such as a tollgate, an interchange (IC) slip road, a point of guiding safe driving, a speed camera, or a speed bump.

The effective distance for acquiring forward data may be a preset distance but may also be variably set in consideration of a current speed, a road type, or the like.

When the deceleration event determiner 311 determines whether the vehicle is capable of responding to an event, this means that whether a control entry point (i.e., a point of guiding release of an accelerator pedal) for each event is positioned forward or is already positioned past the current position of the vehicle in consideration of a target vehicle speed and a remaining distance for each recognized event, a current speed, or the like. Thus, the deceleration event determiner 311 may set a deceleration event to be responded to as a controllable effective event. In this embodiment, when the deceleration event determiner 311 determines whether the vehicle is capable of responding, active coasting control may be considered. A concept of active coasting control is described with reference to FIG. 4.

Figure 4:
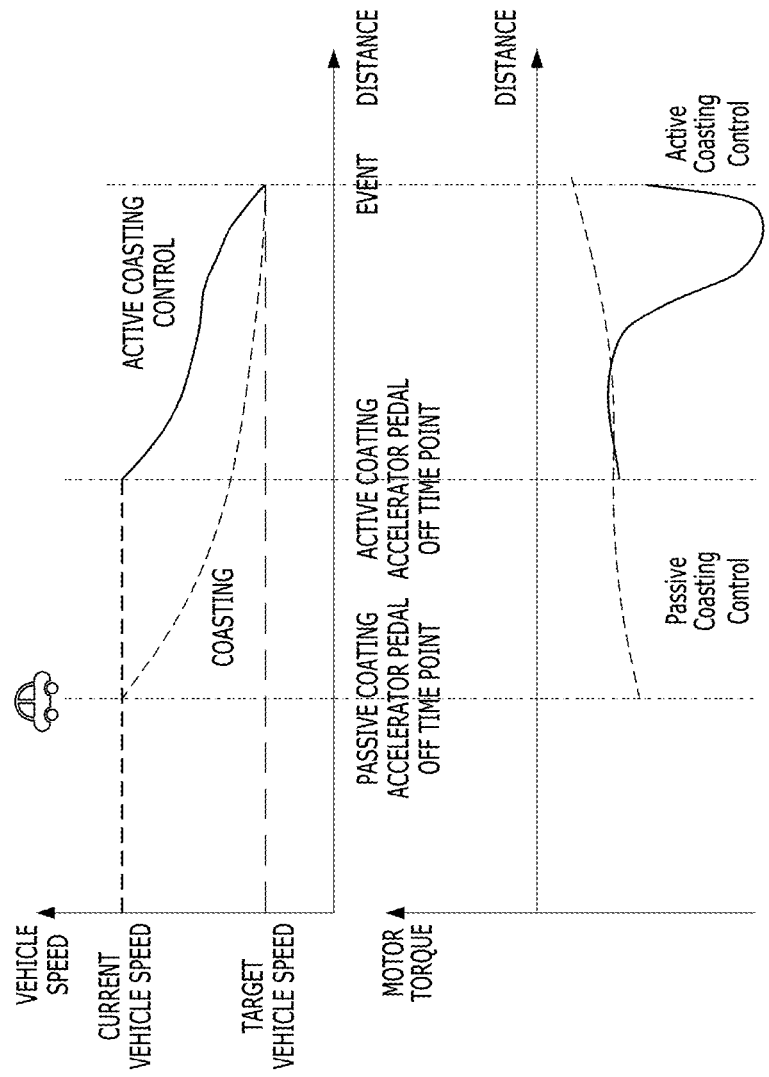
FIG. 4 is a diagram for explaining a concept of active coasting control to which embodiments of the present disclosure are applicable.

FIG. 4 is a diagram for explaining a concept of active coasting control to which embodiments of the present disclosure are applicable.

Referring to FIG. 4, when general coasting control (i.e., passive coasting control) is applied, a preset coasting profile may be applied depending on a vehicle speed. Thus, only deceleration corresponding to coasting characteristics of an internal combustion engine vehicle may be possible. In contrast, when active coasting control is applied, decelerating force may be derived by adding additional decelerating force to the coasting decelerating force to maximize regenerative braking torque when the vehicle approaches a target event. Thus, a time point of releasing the accelerator pedal may become closer to the deceleration event. Thus, when active coasting control is applied, a deceleration section may be remarkably reduced compared with general coasting control. Obstruction is thereby minimized in the flow of surrounding vehicles and a sense of incompatibility of a driver is also minimized due to coasting for a long distance. In this embodiment, coasting torque when active coasting control is applied may be determined in consideration of capability of an electric motor, a state of charge (SoC) of a battery, or the like.

Thus, the deceleration event determiner 311 according to an embodiment may also consider a control entry point in the case of active coasting control when determining whether the vehicle is capable of responding to each deceleration event.

Then, the candidate event setting unit 313 may set one or more candidate events among at least one controllable effective event (hereinafter, "effective event") determined by the deceleration event determiner 311. To this end, the candidate event setting unit 313 may firstly set the closest effective event among effective events as a control target candidate event (or "candidate event"). When there is the remaining effective event except for the closest effective event, the candidate event setting unit 313 may further set an event that needs to be followed with a target speed as a candidate event among the remaining effective events.

A concept of selection of an effective event and a candidate event is described with reference to FIG. 5.

Figure 5:
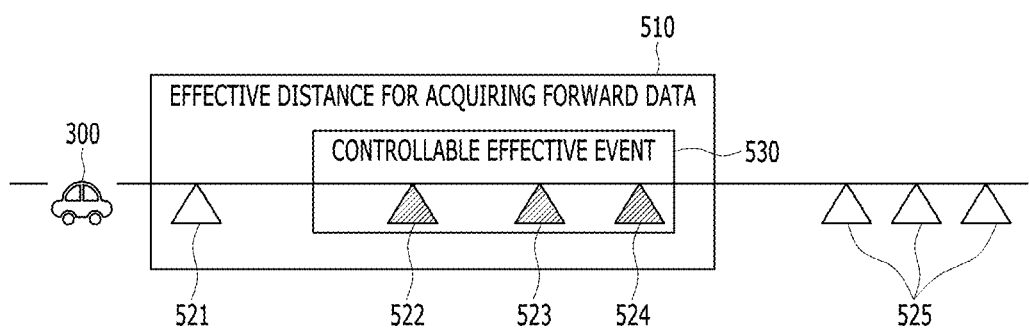
FIG. 5 is a diagram for explaining a concept of a control target candidate event according to an embodiment of the present disclosure.

FIG. 5 is a diagram for explaining a concept of a control target candidate event according to an embodiment of the present disclosure.

Referring to FIG. 5, the eco-friendly vehicle 300 according to an embodiment may determine whether the vehicle is capable of responding to each of deceleration events 521, 522, 523, and 524 present in an effective distance for acquiring forward data 510 based on deceleration event information. The deceleration event to be responded to may be controllable effective events 530. The event 521, by which a target speed is not capable of being followed even through active coasting control, may be processed as an ineffective event such as an event 525 outside the effective distance for acquiring forward data. The event 522 closest to the vehicle 300 among the effective events 530 may firstly become a candidate event. The other effective events 523 and 524 may be further set as a candidate event or not depending on whether a target speed needs to be followed.

Referring back to FIG. 3, an event by which the target speed needs to be followed may be an event by which a penalty is directly imposed when the vehicle fails to follow the target speed, e.g., a speed camera. However, the present disclosure is not limited thereto. The event by which the target speed needs to be followed may be variably set depending on a vehicle manufacturer or a driver reference. The number of events by which the target speed needs to be followed may be one or two or more. As such, the event by which the target speed needs to be followed may be added as a control target candidate event. This is because the vehicle has difficulty in responding to an event when the event by which the target speed needs to be followed while being largely different from that of a target event is present immediately after the closest event is set as the target event.

When the candidate event setting unit 313 sets at least one candidate event, the target event determiner 315 may determine any one of the candidate events as the target event. To this end, the target event determiner 315 may determine the target event in consideration of a type of each candidate event (i.e., the closest candidate event and an event by which the target speed needs to be followed) and a control entry point. For example, when there is no candidate event by which the target speed needs to be followed, the target event determiner 315 may determine the closest candidate event as the target event. The target event determiner 315 may determine a candidate event closer to a control entry (start) point based on a current position as the target event among the closest candidate event and the event by which the target speed needs to be followed. The target event determiner 315 may also determine the closest event as the target event among the closest candidate event and the event by which the target speed needs to be followed. Each case is described in more detail with reference to FIGS. 7-9.

When determining the target event, the target event determiner 315 may output a notification indicating accelerator pedal release through the notification output unit 320 when the vehicle reaches a control entry point of the determined target event. The target event determiner 315 may notify the powertrain controller 317 about the target speed and the remaining distance of the target event.

When the accelerator pedal is released after the target event determiner 315 outputs the notification, the powertrain controller 317 may control coasting torque to satisfy the target speed at a target point of the target event. In this embodiment, the coasting torque control may include the aforementioned active coasting control.

In an embodiment, the controller 310 is accompanied by control of a powertrain. Thus, the controller 310 may be embodied as a hybrid control unit (HCU) in the case of a hybrid vehicle (HEV) and may be embodied as a vehicle control unit (VCU) in the case of an electric vehicle (EV). However, the present disclosure is not limited thereto. For example, the other controllers 311, 313, and 315 except for the powertrain controller 317 may be embodied as separate controllers, and only the powertrain controller 317 may be embodied as a HCU or a motor controller.

Figure 6:
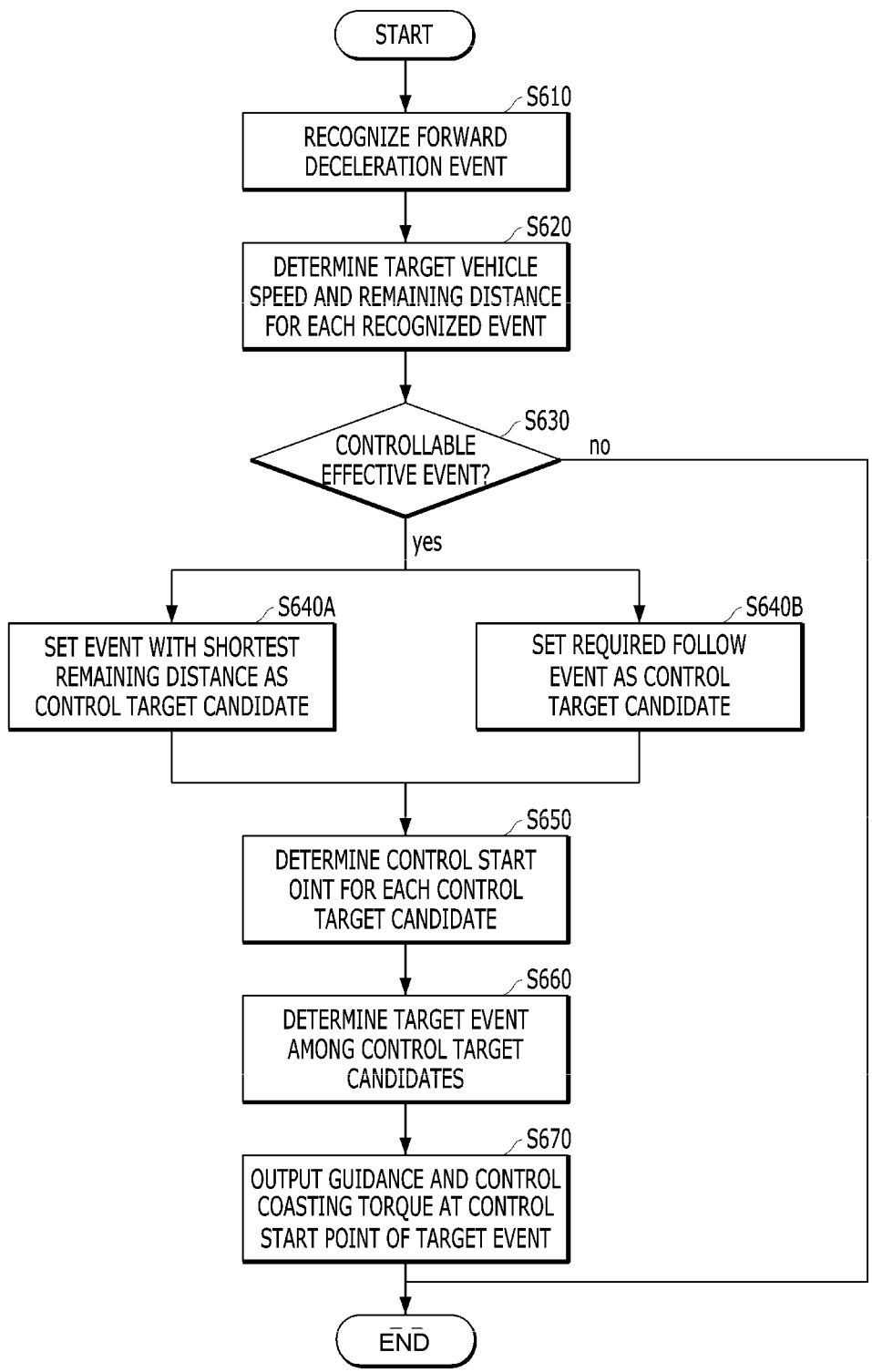
FIG. 6 is a flowchart of an example of a coasting control procedure according to an embodiment of the present disclosure.

The coasting control procedure of the eco-friendly vehicle according to the embodiments described thus far is summarized in a flowchart of FIG. 6.

FIG. 6 is a flowchart of an example of a coasting control procedure according to an embodiment of the present disclosure.

Referring to FIG. 6, first, the deceleration event determiner 311 may recognize a forward deceleration event within an effective distance for acquiring forward data based on information on a deceleration event (S610).

The deceleration event determiner 311 may determine a target vehicle speed and the remaining distance for each recognized event (S620) and may determine whether each event is an effective event (S630).

The candidate event setting unit 313 may set the closest effective event as a control target candidate among events determined as an effective event (S640A). When at least one event (i.e., a must-follow event) whose target speed needs to be followed is present among the other effective events, the candidate event setting unit 313 may further set the event as a candidate event (S640B).

The target event determiner 315 may consider a control start point for each control target candidate (S650) and may determine a target event among the candidate events (S660). Needless to say, as described above, the target event determiner 315 may set the closest event as a target event when there is no must-follow event and may control a control start point for each candidate event when there is a must-follow event.

The target event determiner 315 may perform control to output guidance of releasing an accelerator pedal through the notification output unit 320 at a control start point of the target event. The powertrain controller 317 may perform coasting torque control for satisfying a target speed when the accelerator pedal is released at the control start point (S670).

Figure 7:
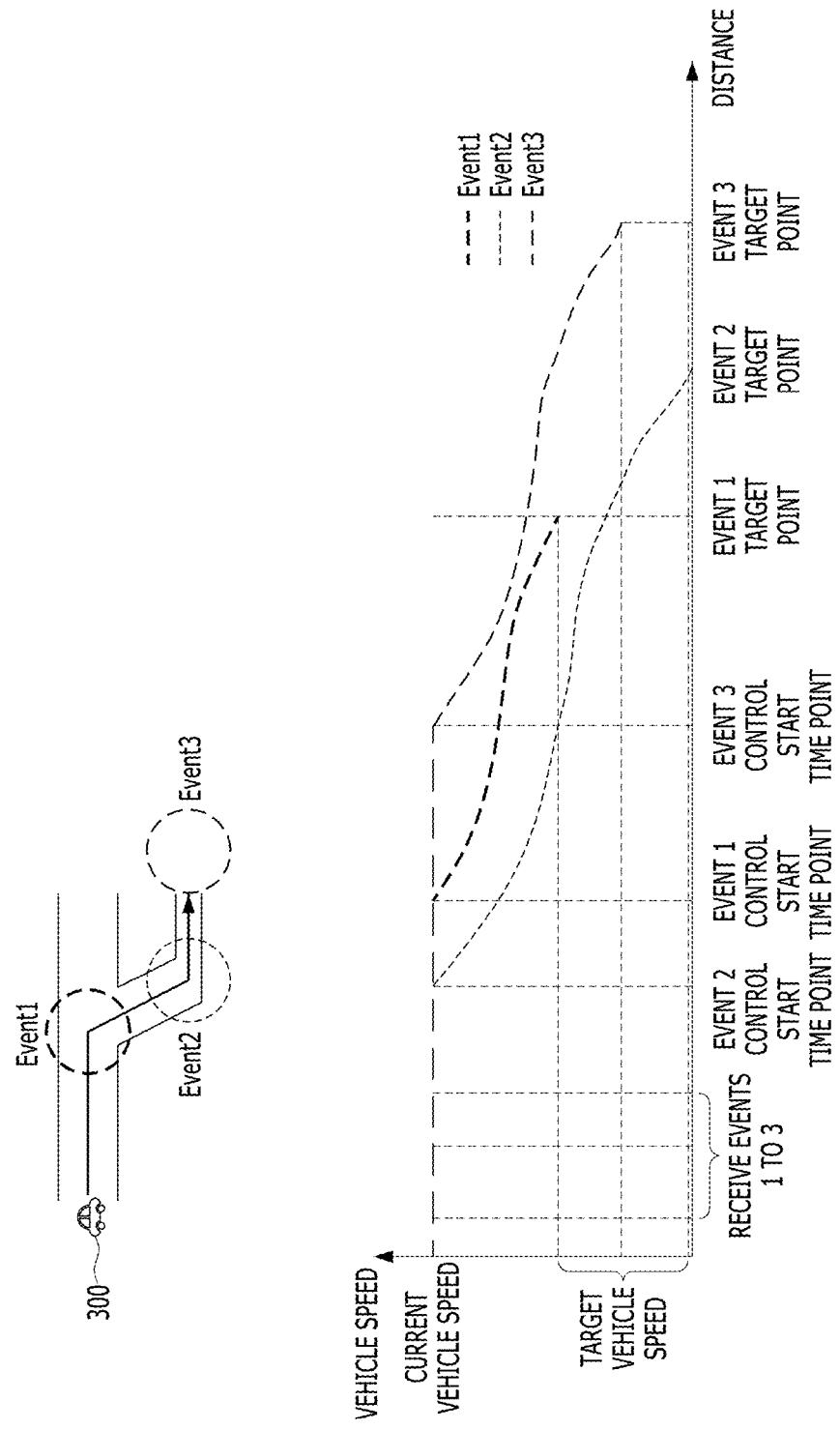
FIG. 7 is a diagram showing an example of the form obtained by applying coasting control according to an embodiment of the present disclosure.
Figure 8:
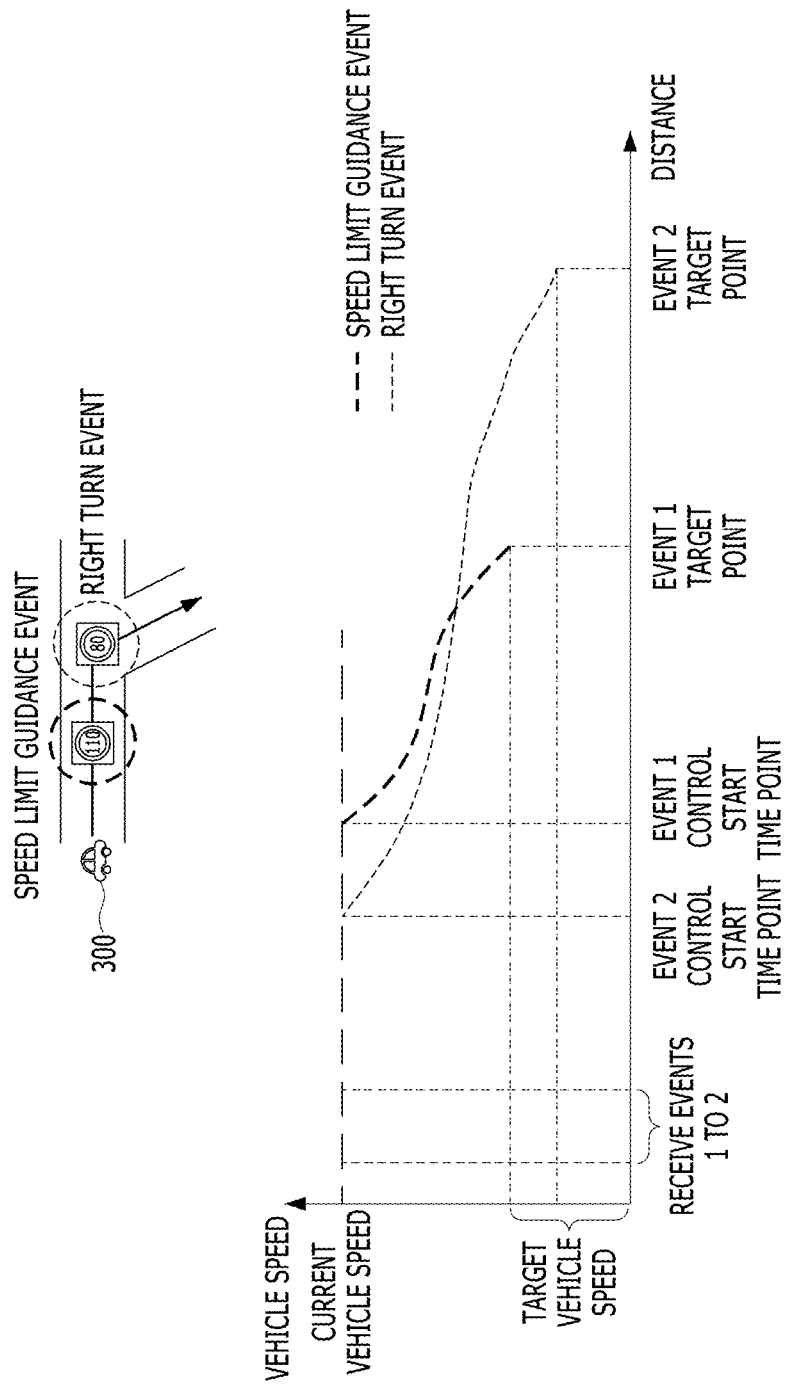
FIG. 8 is a diagram showing another example of the form obtained by applying coasting control according to an embodiment of the present disclosure.
Figure 9:
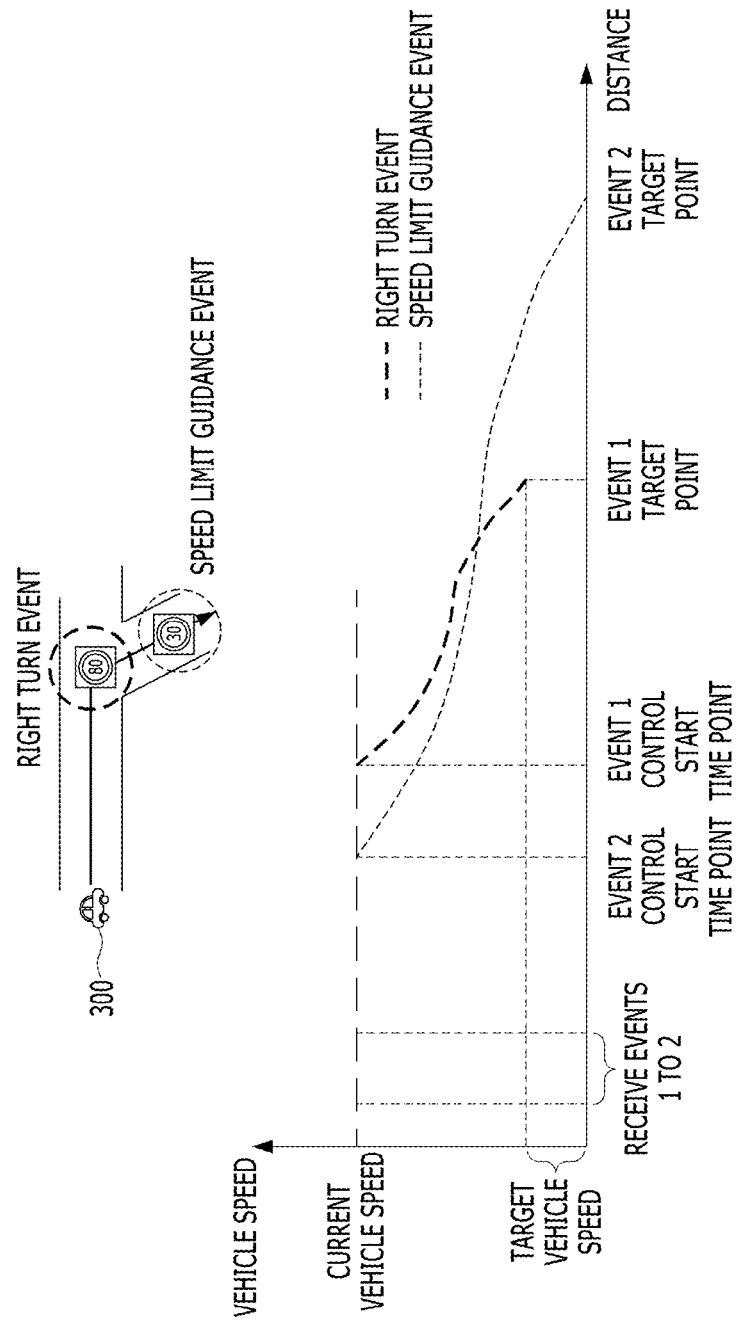
FIG. 9 is a diagram showing another example of the form obtained by applying coasting control according to an embodiment of the present disclosure.

Hereinafter, various forms in which the aforementioned target event determiner determines a target event are described in detail with reference to FIGS. 7-9. In FIGS. 7-9, upper parts commonly indicate a shape of a road on which a vehicle currently travels and lower parts commonly indicate a coasting profile depending on an event target point and a control start point for each event.

FIG. 7 is a diagram showing an example of the form obtained by applying coasting control according to an embodiment of the present disclosure.

In FIG. 7, it may be assumed that three effective events, Event 1 to Event 3, with different target speeds and different control entry points, are present forward or, i.e., ahead of or in front of the vehicle 300 and there is no must-follow event. In this embodiment, the candidate event setting unit 313 may set Event 1 that is the closest effective event as a candidate event and the target event determiner 315 may determine Event 1 that is the closest event as a target event. Thus, the vehicle may follow Event 2 with the earliest control entry point, thereby preventing obstruction in the flow of surrounding vehicles on a current driving path or preventing a sense of incompatibility caused when the vehicle follows a point that is not recognized with the naked eye of a driver.

FIG. 8 is a diagram showing another example of the form obtained by applying coasting control according to an embodiment of the present disclosure.

In FIG. 8, it may be assumed that two events, Event and Event 2, with different target speeds and different control entry points are present forward of, i.e., in front of or ahead of the vehicle 300 and Event 2 is a must-follow event. In this embodiment, the candidate event setting unit 313 may set both Event 1 that is the closest effective event and Event 2 that is a must-follow event as candidate events. The target event determiner 315 may determine Event 2, which is a must-follow event, as a target event. Thus, the must-follow event may be completely followed.

FIG. 9 is a diagram showing another example of the form obtained by applying coasting control according to an embodiment of the present disclosure.

In FIG. 9, it may be assumed that two effective events, Event 1 and Event 2, with different target speeds and different control entry points are present forward of, i.e., in front of or ahead of the vehicle 300 and Event 2 is a must-follow event. In this embodiment, like in FIG. 8, the candidate event setting unit 313 may set both Event 1 that is the closest effective event and Event 2 that is a must-follow event as candidate events. However, differently from FIG. 8, the target event determiner 315 may determine a control start point of each of the two candidate events and may determine Event 2, which is an event with a close control start point, as a target event.

In some embodiments, when a plurality of must-follow events is present, the closest must-follow event may be set as a target event among must-follow events. In some embodiments, a must-follow event with the closest control start point may also be set as a target event among must-follow events.

The eco-friendly vehicle related to at least one embodiment of the present disclosure as configured above may effectively set a target deceleration event and may provide guidance.

In particular, according to embodiments of the present disclosure, when a plurality of deceleration events is present forward of or ahead of a vehicle, a target deceleration event may be determined in consideration of a position and type of a deceleration event and a coasting torque may be actively set. A sense of incompatibility of a driver is thereby reduced and efficiency is thereby enhanced during coasting.

It should be appreciated by those having ordinary skill in the art that the effects that could be achieved with the present disclosure are not limited to what has been particularly described hereinabove. Other advantages of the present disclosure should be more clearly understood from the detailed description.

The aforementioned present disclosure can also be embodied as computer readable code stored on a computer readable recording medium. The computer readable recording medium is any data storage device that can store data, which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

It should be apparent to those having ordinary skill in the art that various modifications and variations can be made in the present disclosure without departing from the spirit or scope of the disclosure. Thus, it is intended that the present disclosure cover the modifications and variations of this disclosure, provided that they come within the scope of the appended claims and their equivalents.

What is claimed is:

1. A method of controlling coasting of an eco-friendly vehicle, the method comprising:
   determining at least one effective event among deceleration events configured with a target speed in a forward driving path;
   setting a closest effective event based on a current position among the at least one effective event as a first candidate event;
   determining whether at least one second candidate event corresponding to an event needed to be followed is present among remaining effective events except for the first candidate event of the at least one effective event; and
   when the at least one second candidate event is present, determining a target event among the first candidate event and the second candidate event in consideration of a control start point,
   wherein the control start point is a point in time when the accelerator pedal is released and coasting torque control of an electric motor is performed to approach the target speed.

2. The method of claim 1, wherein the deceleration event configured with the target speed includes at least one deceleration event present within an effective distance for acquiring forward data from the current position.

3. The method of claim 2, wherein the determining the at least one effective event includes:
   determining the control start point with respect to each of the at least one deceleration event present within the effective distance for acquiring the forward data; and
   determining a deceleration event that is not already positioned past the control start point among the at least one deceleration event present within the effective distance for acquiring the forward data as the at least one effective event.

4. The method of claim 1, wherein, when the second candidate event is not present, the determining the target event includes determining the first candidate event as the target event.

5. The method of claim 1, wherein, when the second candidate event is present, the determining the target event includes:
 determining a candidate event closest to a point of guiding release of an accelerator pedal among the first candidate event and the second candidate event as the target event.

6. The method of claim 1, wherein, when the plurality of second candidate events are present, the determining the target event includes determining a candidate event closest to a point of guiding release of an accelerator pedal among the second candidate events as the target event.

7. The method of claim 1, further comprising:
 outputting a notification indicating release of an accelerator pedal at a point of guiding release of an accelerator pedal corresponding to the target event.

8. The method of claim 7, further comprising:
 performing coasting torque control of the electric motor to satisfy the target speed corresponding to the target event when manipulation of the accelerator pedal is released according to the notification indicating release of the accelerator pedal.

9. The method of claim 8, wherein the coasting torque control includes active coasting control that varies coasting torque in response to a remaining distance.

10. A non-transitory computer-readable recording medium having recorded thereon a program for executing the method of claim 1.

11. An eco-friendly vehicle comprising a controller including:
 a deceleration event determiner configured to determine at least one effective event among deceleration events configured with a target speed in a forward driving path;
 a candidate event setting unit configured to set a closest effective event based on a current position among the at least one effective event as a first candidate event, and configured to determine whether at least one second candidate event corresponding to an event needed to be followed is present among remaining effective events except for the first candidate event of the at least one effective event; and
 a target event determiner configured to, when the at least one second candidate event is present, determine a target event among the first candidate event and the second candidate event in consideration of a control start point,
 wherein the control start point is a point in time when the accelerator pedal is released and coasting torque control of an electric motor is performed to approach the target speed.

12. The eco-friendly vehicle of claim 11, wherein the deceleration event configured with the target speed includes at least one deceleration event present within an effective distance for acquiring forward data from the current position.

13. The eco-friendly vehicle of claim 12, wherein the deceleration event determiner determines the control start point with respect to each of the at least one deceleration event present within the effective distance for acquiring the forward data, and determines a deceleration event that is not already positioned past the control start point among the at least one deceleration event present within the effective distance for acquiring the forward data as the at least one effective event.

14. The eco-friendly vehicle of claim 11, wherein the target event determiner determines the first candidate event as the target event when the second candidate event is not present.

15. The eco-friendly vehicle of claim 11, wherein the target event determiner determines a candidate event closest to a point of guiding release of an accelerator pedal among the first candidate event and the second candidate event as the target event when the second candidate event is present.

16. The eco-friendly vehicle of claim 11, wherein the target event determiner determines a candidate event closest to a point of guiding release of an accelerator pedal among the second candidate events as the target event when the plurality of second candidate events are present.

17. The eco-friendly vehicle of claim 11, further comprising:
 a notification output unit configured to output a notification indicating release of an accelerator pedal at a point of guiding release of an accelerator pedal corresponding to the target event.

18. The eco-friendly vehicle of claim 17, wherein the controller further includes a powertrain controller configured to perform coasting torque control of the electric motor to satisfy the target speed corresponding to the target event when manipulation of the accelerator pedal is released according to the notification indicating release of the accelerator pedal.

19. The eco-friendly vehicle of claim 18, wherein the coasting torque control includes active coasting control that varies coasting torque in response to a remaining distance.

* * * * *